United States Patent [19]

Duncan

[11] Patent Number: 4,852,254

[45] Date of Patent: * Aug. 1, 1989

[54] RAZOR BLADE ASSEMBLY AND ITS METHOD OF MANUFACTURE

[75] Inventor: David S. Duncan, London, England

[73] Assignee: Wilkinson Sword Limited, United Kingdom

[*] Notice: The portion of the term of this patent subsequent to Sep. 1, 2004 has been disclaimed.

[21] Appl. No.: 58,804

[22] Filed: Jun. 5, 1987

Related U.S. Application Data

[63] Continuation of Ser. No. 777,158, Sep. 18, 1985, Pat. No. 4,690,018.

[51] Int. Cl.⁴ .................. B26B 21/06; B26B 21/14
[52] U.S. Cl. ................................ 30/50; 30/47; 76/101 R
[58] Field of Search ............... 30/50, 342, 58, 47; 76/DIG. 8, 104 R, 101 R

[56] References Cited

U.S. PATENT DOCUMENTS 3,240,070  4/1973  Dorion ........................... 30/50
3,879,844  4/1975  Griffiths ........................ 30/47
4,443,940  4/1984  Francis et al. ................. 30/50

Primary Examiner—Douglas D. Watts
Attorney, Agent, or Firm—Finnegan, Henderson, Farabow, Garrett & Dunner

[57] ABSTRACT

This invention concerns a razor blade assembly in which a double edged blade strip 9, which subsequently provides first and second blades 10,16 of a twin bladed assembly, is provided, in an insert moulding operation, with a blade platform 11, end walls 15, a guard bar 14 and a blade spacer 13 moulded on the first blade 10, and a top cap 17, end walls 22, a spacer 18 and rivets 20 moulded on the second blade 16. After cropping of the metal joining the two blades or after folding over one blade on to the other, the rivets 20 are brought into apertures 21 in the first blade 10 and blade platform 11 to locate the two blades with their edges parallel and in staggered mutual relationship. Finally the portions of the rivets 20 projecting through the blade platform 11 are flattened to permanently lock the two parts of the assembly together.

10 Claims, 3 Drawing Sheets

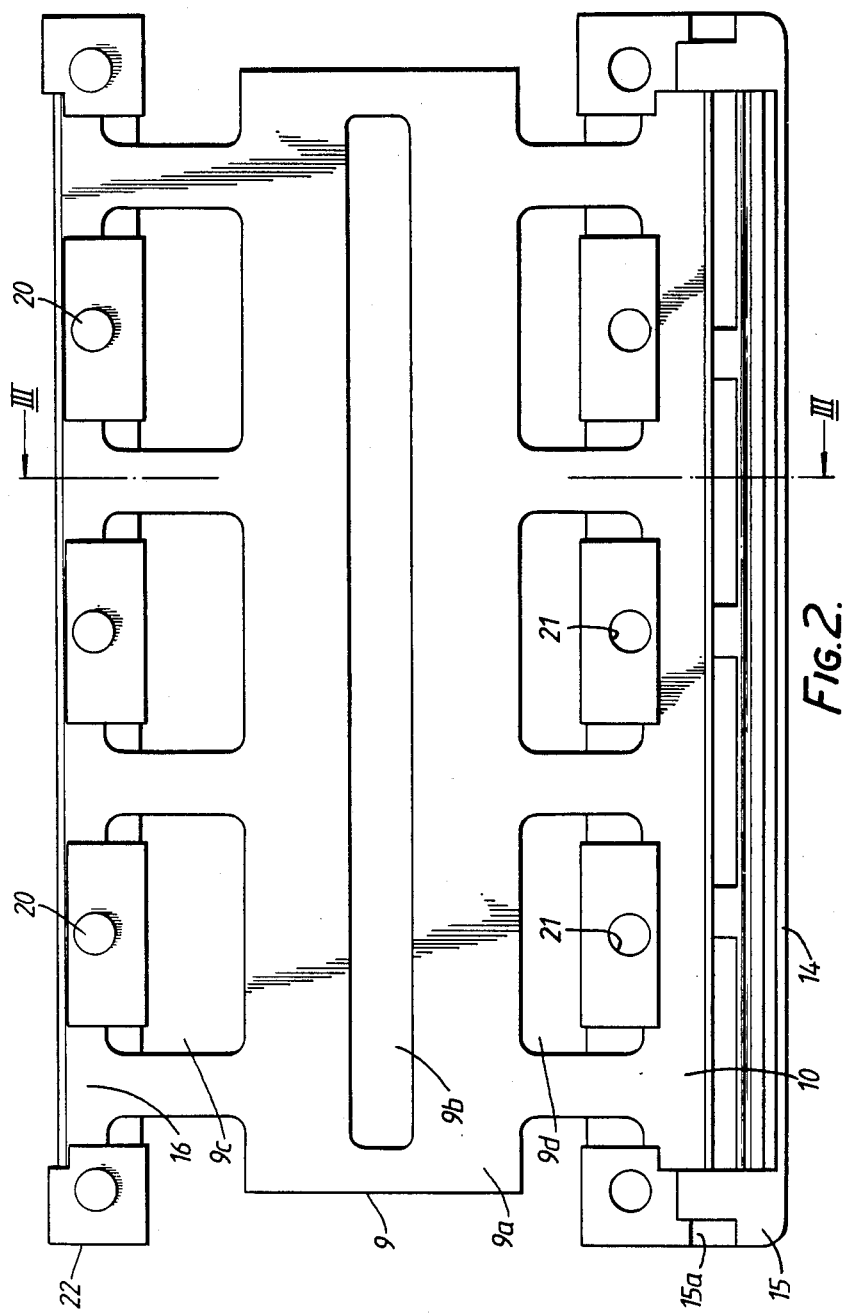

RAZOR BLADE ASSEMBLY AND ITS METHOD OF MANUFACTURE

This is a continuation of application Ser. No. 777,158, filed on Sept. 18, 1985, now U.S. Pat. No. 4,690,018.

This invention relates to a razor blade assembly and its method of manufacture. By "razor blade assembly" is meant either a shaving unit comprising one or more blades mounted in a holder which is adapted to be secured to a handle, or a complete razor comprising a shaving unit and a handle formed separately or integrally. The razor blade assembly to which the present invention relates has at least two razor blades.

One of the best known methods of manufacturing razor blade assemblies comprises forming in one piece a blade platform and a guard bar out of plastics material, forming a top cover out of plastics material and sandwiching a razor blade between the top cap and the blade platform. The top cap and blade platform are thereafter riveted together. In a modification, a second blade is superimposed on the first blade, the two blades being located in space-apart staggered relationship by means of a plastics spacer interposed between them before the top cap is riveted to the blade platform. These methods however include a substantial number of steps each of which involves separately locating the parts relative to one another prior to the final riveting operation.

According to the present invention there is provided a razor blade assembly comprising a first blade on to which has been moulded a blade platform and a guard bar, a second blade on to which has been moulded a top cap, and means securing the second blade to the first blade in parallel spaced and staggered relationship thereto. The securing means can be rivets which are moulded integrally with the top cap.

According to another aspect of the present invention there is provided a method for the manufacture of a razor blade assembly which comprises forming cutting edges on first and second blades, moulding a blade platform and guardbar on to said first blade, moulding a top cap on to said second blade, locating the second blade above and parallel spaced from the first blade with the cutting edges of the blades parallel to one another but in mutually staggered relationship, and securing the blades rigidly with respect to one another.

The present invention will now be particularly described by way of example only with reference to the accompanying drawings in which:

FIG. 2 is a plan view of a double edged blade on to which parts of the razor assembly have been moulded during one step of manufacture;

Figure 1:
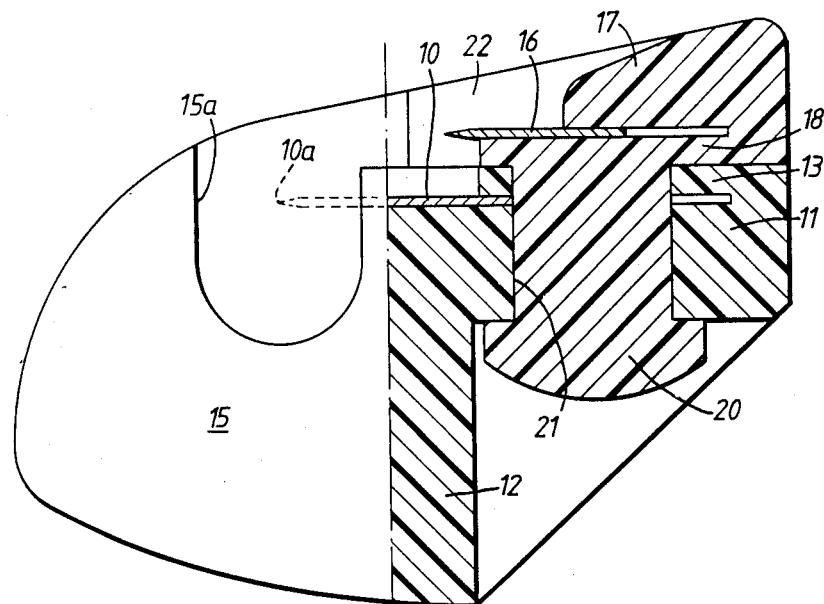
FIG. 1 is a vertical section through a finished blade assembly in accordance with the present invention.

As shown in FIG. 1, the finished razor blade assembly comprises a first blade 10 which, by means of an insert moulding process, has moulded on to it a blade platform 11, a support 12 extending downwardly perpendicular to the forward part of the blade platform and a half spacer 13 integral with the blade platform but extending above the first blade 10 and therefore on the opposite side of the first blade to the blade platform 11.

Also integral with the blade platform is a guard bar 14 extending parallel to the cutting edge 10a of the blade 10, and end walls 15.

Figure 3:
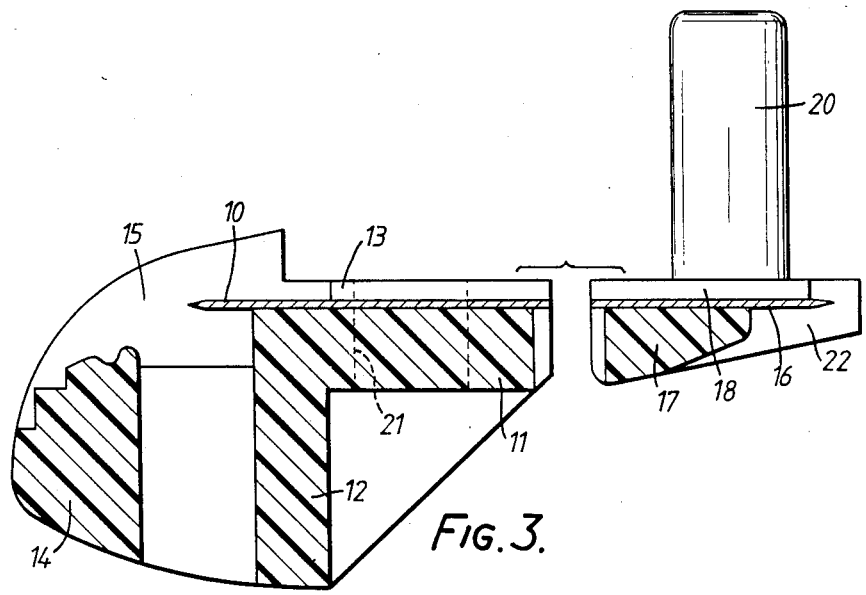
FIG. 3 is a section on the line III—III of FIG. 2 taken after the central portion of the blade has been cropped out.
Figure 4:
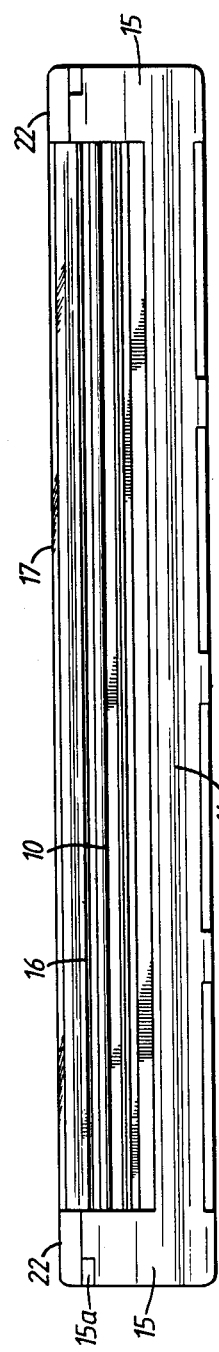
FIG. 4 is a front elevation of the assembly.
Figure 5:
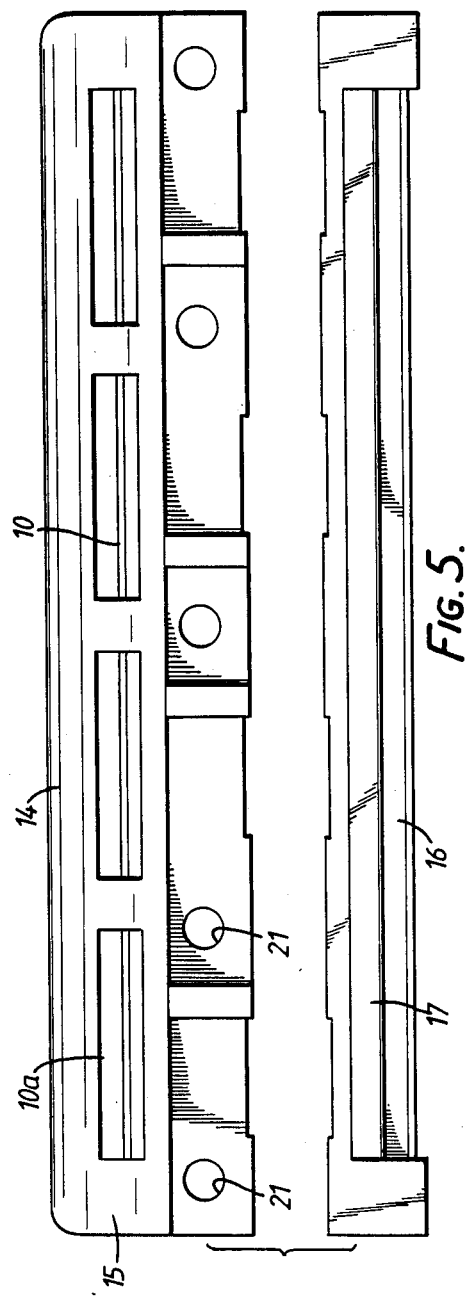
FIG. 5 is an underneath view of the parts shown in FIG. 3.

A second part of the assembly comprises a second blade 16 which, in an insert moulding process, has had a top cap or blade cover 17 moulded on one side thereof and a second half spacer 18 moulded on the opposite side thereof together with a number, for example five, of rivets 20 which extend downwardly from the half spacer 18 as seen in FIG. 1 or upwardly as seen in FIG. 3. Preferably end wall portions 22 are formed integrally with the top cap 17. Such wall portions 22, in the completed blade assembly, can form smooth continuations of the end walls 15 of the blade platform and extend across the ends of the second blade 16.

The process of completing the blade assembly therefore consists in merely bringing together the two parts of the assembly described above by introducing the rivets 20 into openings 21 which pass through the first blade 10 and through the blade platform 11 until the tips of the rivets project on the underside of the blade platform. These projecting portions of the rivets 20 are then flattened to lock the second blade 16 and top cap 17 permanently to the first blade 10 and blade platform 11.

Having briefly described the razor blade assembly and its method of manufacture, these will now be considered in further detail.

As seen from FIG. 2, the process starts with the production of a conventional double edged wafer-type strip of blade steel formed with a central row of perforations, and two further rows of perforations on each side of the central row. It is also formed with a cutting edge along each side. Each of the central perforations is of a length corresponding to the length of the cutting edge of a finished blade, so that by cropping the blade strip between adjacent central perforations, a series of twin edged blade members 9 is formed. Each blade member comprises the first blade 10, the second blade 16 and an interconnecting strip of blade metal 9a containing the central perforation 9b. Two further rows of perforations 9c,9d lying between the blades 10 and 16 and the interconnecting strip assist in the subsequent moulding process. Apart from the first and second blades, 9,10 all the parts of the blade assembly are moulded in synthetic resin plastics material, and insert moulds for this purpose are shaped to provide a guard bar spaced from the blade platform by rinsing apertures with the end walls of the finished blade assembly extending alongside the opposite ends of the razor blades and covering the raw ends of the blades.

Each of the end walls 15 is formed with a circular outwardly-opening recess 15a to enable the blade assembly to be mounted in a Y-shaped or forked shaped handle (not shown). Adjacent the outer ends of the arms of the fork of such a handle, inwardly projecting pivot pins are provided which engage in the pivot recesses 15a to mount the razor blade assembly pivotally on the handle. A resilient buffer on the handle is provided to abut against the support 12 to oppose rotation of the blade assembly in one direction. Rotation of the opposite direction is limited by the underside of the blade platform coming into contact with the buffer.

The insert moulding process is carried out on the double edged composite blade member 9 shown in FIG. 3, to form the blade platform 11, support 12, guardbar 14 and first half spacer 13 on blade 10, and to form the top cap 17, second half spacer 18 and rivets 20 on blade 16. The blade member is then cropped along lines close to the mouldings to cut out the blade metal strip 9a and thereby form the two parts of the assembly. These two parts are then brought together by rotating one part through 180° relative to the other to bring the rivets 20 on one part of the assembly into the openings 21 in the other part of the assembly. Thereafter the two parts of the assembly are secured together by flattening the rivets as described above to form heads thereon.

In an alternative method of assembly, the metal blade strip 9a is not cropped out as described above but instead is bent about its central axis by bending of the webs which extend across opposite ends of the central aperture 9b until the rivets 20 lie opposite the openings 21. The rivets 20 are then inserted through the openings 21 and the two parts of the assembly are brought into their final relative position for riveting. The blade metal strip 9a protruding from the back of the completed assembly is then cropped off.

Although the invention has been described as providing rivets to secure the parts of the assembly together, other means could be used for securing the parts together such as ultrasonic welding, high frequency welding, snap fasteners or adhesive.

I claim

1. A double edge razor assembly comprising:
   a first integrally molded portion including a first blade molded between a blade platform with a guard bar and a first half spacer formed integrally with the blade platform; and
   a second integrally molded portion including a second blade integrally molded between a top cap and a second half spacer formed integrally with the top cap;
   the molded portions having complementary fastening means for securing the first integrally molded portion to the second integrally molded portion.

2. The double edge razor assembly according to claim 12 further including end walls molded integrally with said blade platform and extending across the ends of the first blade.

3. The double edge razor assembly according to claim 2 having end portions molded integrally with said top cap and extending across the ends of the second blade.

4. The double edge razor assembly according to claim 3 wherein each of said end portions forms a smooth continuation of a corresponding one of said end walls.

5. A double edge razor assembly comprising:
   a first integrally molded portion including a first blade molded between a blade platform with a guard bar and a first half spacer formed integrally with the blade platform; and
   a second integrally molded portion including a second blade integrally molded between a top cap and a second half spacer formed integrally with the top cap;
   one of said integrally molded portions having rivets extending from its respective half spacer and the other integrally molded portion having complementary openings into which said rivets are fastened to secure the first integrally molded portion to the second integrally molded portion.

6. The double edge razor assembly of claim 5 wherein the assembly is formed by a process comprising the steps of:
   (a) forming a single integrally molded portion including said first integrally molded portion and said second integrally molded portion; and
   (b) cropping said single integrally molded portion at its center to form said first integrally molded portion and said second integrally molded portion.

7. The double edge razor assembly of claim 6 further comprising the step of rotating said second integrally molded portion 180° relative to said first integrally molded portion whereby said rivets are introduced into said openings and secure said first integrally molded portion to said second integrally molded portion such that said second blade is superimposed on said first blade and is located in parallel spaced and staggered relationship with respect to said first blade.

8. The double edge razor assembly of claim 5 wherein the assembly is formed by a process comprising the steps of:
   (a) forming a single integrally molded portion including said first integrally molded portion and said second integrally molded portion; and
   (b) bending said single integrally molded portion about its central axis to rotate said second integrally molded portion 180° relative to said first integrally molded portion whereby said rivets are introduced into said openings and secure said first integrally molded portion to said second integrally molded portion such that said second blade is superimposed on said first blade and is located in parallel spaced and staggered relationship with respect to said first blade.

9. A method of manufacturing a double edge razor assembly comprising the steps of:
   (a) integrally molding a first blade between a blade platform with a guard bar and a first half spacer formed integrally with the blade platform to form a first integrally molded portion;
   (b) integrally molding a second blade between a top cap and a second half spacer formed integrally with said top cap to form a second integrally molded portion; and
   (c) fastening together complementary fastening means on the first and second portions.

10. A method of manufacturing a double edge razor assembly comprising the steps of:
   (a) integrally molding a first blade between a blade platform with a guard bar and a first half spacer formed integrally with the blade platform to form a first integrally molded portion;
   (b) integrally molding a second blade between a top cap and a second half spacer formed integrally with said top cap to form a second integrally molded portion, one of said integrally molded portions having rivets extending from its respective half spacer and the other integrally molded portion having complementary openings therein; and
   (c) fastening said rivets into said openings to secure the first integrally molded portion to the second integrally molded portion.

* * * * *

UNITED STATES PATENT AND TRADEMARK OFFICE
CERTIFICATE OF CORRECTION

PATENT NO. : 4,852,254

DATED : August 1, 1989

INVENTOR(S) : David S. DUCAN

It is certified that error appears in the above-identified patent and that said Letters Patent is hereby corrected as shown below:

Claim 2, line 2, (Column 3, line 38), "12" should be --1--.

Signed and Sealed this

Twenty-second Day of May, 1990

Attest:

HARRY F. MANBECK, JR.

Attesting Officer

Commissioner of Patents and Trademarks